(12) United States Patent
Baffes et al.

(10) Patent No.: US 8,229,903 B2
(45) Date of Patent: Jul. 24, 2012

(54) SUGGESTING DATA INTERPRETATIONS AND PATTERNS FOR UPDATING POLICY DOCUMENTS

(75) Inventors: Paul T. Baffes, Austin, TX (US); John Michael Garrison, Austin, TX (US); Michael Gilfix, Austin, TX (US); Allan Hsu, Centerville, OH (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2285 days.

(21) Appl. No.: 10/324,514

(22) Filed: Dec. 19, 2002

(65) Prior Publication Data
US 2004/0122823 A1 Jun. 24, 2004

(51) Int. Cl.
*G06F 7/00* (2006.01)
*G06F 17/00* (2006.01)
(52) U.S. Cl. .......... 707/694; 707/661; 707/634
(58) Field of Classification Search .......... 707/6, 9, 707/101, 102, 3, 1, 2, 5, 661, 694, 634; 713/201; 714/39; 705/4, 1; 726/1; 704/200; 709/203
See application file for complete search history.

(56) References Cited

U.S. PATENT DOCUMENTS

| | | | |
|---|---|---|---|
| 5,819,258 A * | 10/1998 | Vaithyanathan et al. | 707/2 |
| 5,887,120 A * | 3/1999 | Wical | 706/46 |
| 5,970,464 A | 10/1999 | Apte et al. | |
| 6,038,560 A * | 3/2000 | Wical | 707/5 |
| 6,101,515 A * | 8/2000 | Wical et al. | 715/531 |
| 6,151,584 A | 11/2000 | Papierniak et al. | |
| 2002/0091942 A1* | 7/2002 | Cooper et al. | 713/201 |
| 2003/0097617 A1* | 5/2003 | Goeller et al. | 714/39 |
| 2004/0158569 A1* | 8/2004 | Evans et al. | 707/100 |

OTHER PUBLICATIONS

Satyam Computer Services Ltd.; Copyright 2001 Satyam Computer Services Ltd.; http://www.satyam.com/s_tnetwork4.html.

* cited by examiner

*Primary Examiner* — Giovanna Colan
(74) *Attorney, Agent, or Firm* — Yudell Isidore Ng Russell PLLC

(57) ABSTRACT

A system and method for utilizing data mining to generate a policy document or to revise theory within a policy document. A data base of unknown events is mined for application to the development of a system management policy document. The results of the data mining of the database of unknown events are automatically incorporated into a policy document, subject to user approval, to produce a new policy document or an updated version of an existing policy document.

29 Claims, 5 Drawing Sheets

SUGGESTING DATA INTERPRETATIONS AND PATTERNS FOR UPDATING POLICY DOCUMENTS

CROSS REFERENCE TO RELATED APPLICATIONS

The present application shares specification text and figures with the following co-pending application, which was filed concurrently with the present pending application: application Ser. No. 10/324,502 entitled "Developing and Assuring Policy Documents Through a Process of Refinement and Classification," the entire contents of which are hereby incorporated by reference.

BACKGROUND OF THE INVENTION

1. Technical Field

The present invention relates generally to data processing systems and in particular to data analysis and interpretation on a data processing system. Still more particularly, the present invention relates to a method, system, and program product for dynamically expanding policy documents for data processing systems and networks utilizing dynamic data analysis and interpretation.

2. Description of the Related Art

The utilization of computer networks by companies and corporations has become the norm for internal communication and sharing of information and assets. Many business today have an internal network that connects the employee terminals to a central server (or server banks). These internal networks are often further connected to an external network, such as the Internet. In certain situations the business network comprises external customer systems as in online retail businesses, etc.

Networks require maintenance, and most networks are maintained by a system administrator, who is responsible for upkeep of the network and security of the network. Security is becoming increasingly important as many businesses maintain valuable company assets on their network. In addition, business offering customer services over their networks are increasingly concerned about the security of the online transactions and services provided. As the need for security increases and more and more companies utilize their networks to carry out day to day business and transmit secure information, the burden of system administration has greatly increased.

In addition to the security concerns, network administrators are responsible for providing basic operating rules that govern the way the network resources are utilized. These operating rules are required to provide stability and consistency in the network, which is being utilized by a large number of different user for different purposes and in different ways.

Current methods by which a network administrator is able to ensure that a network is utilized properly, while maintaining network security, include utilization of a policy document. The policy document is a series of statements, rules or constraints, on network resources that should be respected by the users of the system. The document is important because the document helps to define assets within a network and the proper use of these assets. The policy documents also define what assets to protect, and how and when those assets are to be protected. Ideally, the document is written in a language that very closely resembles human readable language, which can be translated into a form usable by the computer.

The initial policy document is created by system administration, who spends a significant amount of time deciding on the various rules to apply to the particular network. The policy document defines the proper use of the network based on a set of known events occurring on the network, which the system administrator incorporated into the rule base of the security document. All other events occurring in the network are untracked and represent unknown network events from the perspective of the policy document. Since each network is different, the rules provided for one network may be very different for another network. The policy document is network specific because the document is closely tied to the needs of the business, or entity, that is utilizing the network. For example, an event which is unknown in one network may be required to be included within the rule base of a policy document (i.e., a known event) in another network. Thus, each network requires the creation of an initial policy document, often completely. Notably also, the policy document does not change in response to changes in the network. Rather, the document only changes in response to an individual's idea of how the network services should be utilized and the resources allocated.

Irrespective of these shortcomings, many networks utilize policy documents because the policy documents are crucial for managing business processes and resources. The policy documents serve as a baseline for performance and quality assessment, as well as a means for communicating those criteria to others. In the context of network security, policy documents define what constitutes appropriate utilization of network resources, when those resources should be utilized, and by whom.

While prominent security organizations like SANS insist that a formal information security policy document is fundamental to the security of any network, few organizations have one. The lack of formal security policy documents is primarily because creating a formal security policy document is a daunting and time intensive task and offers no immediate benefit. A typical network has a very large number of operating features that has to be described; yet once these features are captured within the security policy document, the monitoring, tasks of the network administrator is still not made easier. Most notably, changes in the way a network operates or is utilized (i.e., changes in the rules desired within a policy document currently in place) is not easily accomplished, particularly when those changes involve events, which were previously not tracked within the rule base of the policy document.

Typically, when a network is running (particularly as the size and use of the network increases), a significantly large number of unknown events are occurring that were not considered important during the creation of the initial policy document. Over time, these events may eventually be considered relevant for tracking within the policy document. However, although these unknown events are seen by the monitoring component of the policy document, these events are not considered to be of interest and not specifically identified by the policy document. Also, with such a large database of events, the task of reading through this database to select significant events (previously unknown) and/or updating the policy document to cover selected ones of the unknown events is daunting.

Thus, despite the introduction of the policy document, there is presently no mechanism available to enable the System Administrators (SAs) to easily generate or update a policy document from captured "unknown" data during network operation that includes these unknown events. There is no available method or system that enables/assists a system administrator to dynamically develop and expand a policy document over time and to introduce additional or new policies that deal with events which were not instituted within the rule base of a previous version of the policy document.

SUMMARY OF THE INVENTION

Disclosed is a system and method for utilizing data mining to generate a policy document or to revise theory within a policy document. A data base of unknown events is mined for application to the development of a system management policy document. The results of the data mining of the database of unknown events are automatically incorporated into a policy document, subject to user approval, to produce a new policy document or an updated version of an existing policy document.

As stated within the claims, the invention provides a method and system for automatic interpretation of system data utilized in the generation of a policy document. The invention involves the process of filtering through each unknown event in a database of unknown events; selectively determining which unknown events among all of the unknown events in a database should be considered for inclusion in said policy document; and updating the rule base of the policy document with event examples associated with the unknown events.

The unknown events within the database are analyzed and trends within the database of unknown events are identified. That is, the history of the response provided to the particular event(s) is utilized to determine what proposed changes or additions are required in the rule set. Suggested elements from the database for inclusion in the policy documents are outputted to the system administrator for approval or modification.

As a part of the analysis of the unknown events, the associated data is converted from text to a code form that is readable by a clustering algorithm. Similar elements within the database are then grouped to generate a feature (or token) vector with an associated set of valid values. The grouping of similar events involves grouping similar event examples into clusters, which are then outputted to a system administrator, who is allowed to manipulate parameters of the clustering algorithm to produce different clusters.

The converting step is completed by a parser function and includes: dividing the database into tokens, wherein each line within the database is split into words separated by a blank space; collecting a single occurrence of each token, to eliminate possible duplication of tokens within a collected dictionary of tokens line with a greatest number of tokens; assigning the largest number of tokens in the various lines as the length of the token vectors utilized to convert events of the database into examples for the clustering algorithm; and collecting output examples into event examples.

The above, as well as additional features and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention describes a method for automatically identifying and "mining" the "unknown" events occurring within a network based on historical treatment of the event to generate new policy features and update the rule base of a policy document of the network. The invention solves the problem of tracking historical treatment of events not previously considered important (i.e., unknown) and subsequently updating policy documents to account for these events in an efficient manner. The invention allows the system administrator to develop a more effective policy document over time, and to introduce additional or new policies that deal with events, which were not addressed in a previous version of the policy document.

The invention recognizes that in order for the system administrator to accomplish the policy document update and other features, the system administrator must have a mechanism for looking through the unknown events to pick out those events that should subsequently be considered for inclusion in the policy document. The present invention, by providing a semi-automated method for mining the database of unknown event, provides the system administrator with a useful set of tools for combing through a current database of unknown events to select new elements for refining a policy document.

Figure 1A:
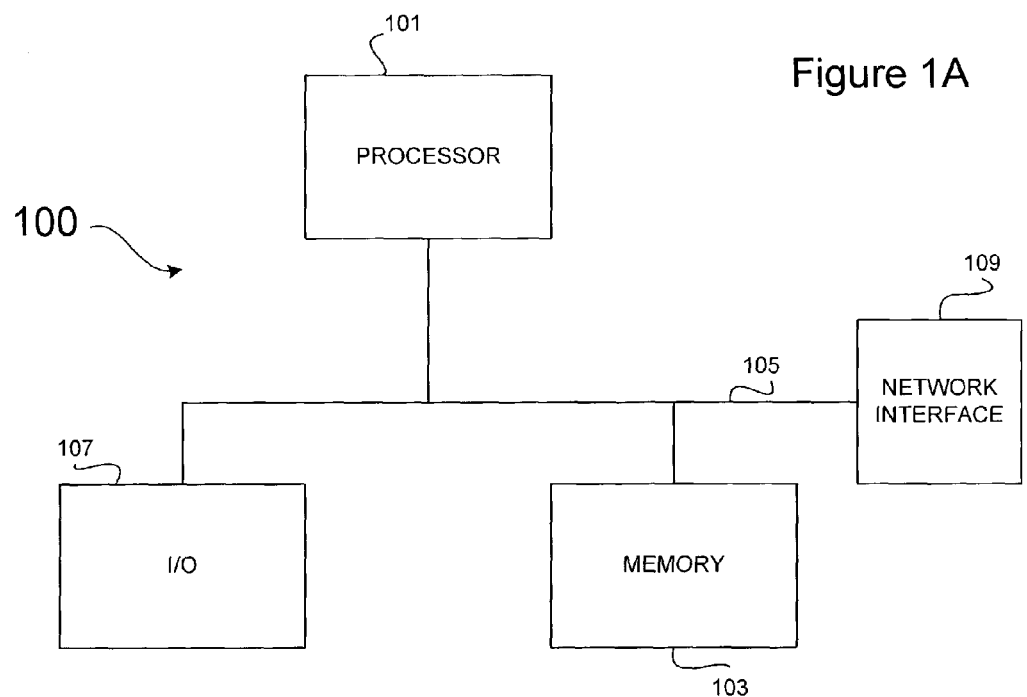
FIG. 1A is a block diagram representation of a data processing system in which the features of the present invention may be implemented.

Referring now to the figures, and in particular to FIG. 1A, there is illustrated the major components of a data processing system within which the semi-automated features of the invention may be implemented. Data processing system 100 comprises processor 101 coupled to memory 103 via interconnect 105. Data processing system 100 also comprises Input/Output (I/O) component 107, by which a system administrator or other user may interact with data processing system 100 or receive output of processes occurring on data processing system 100. Data processing system also includes network interface 109, with which data processing system 100 connects to an external network. Network interface may be a modem, ethernet card, or similar component.

Figure 3A:
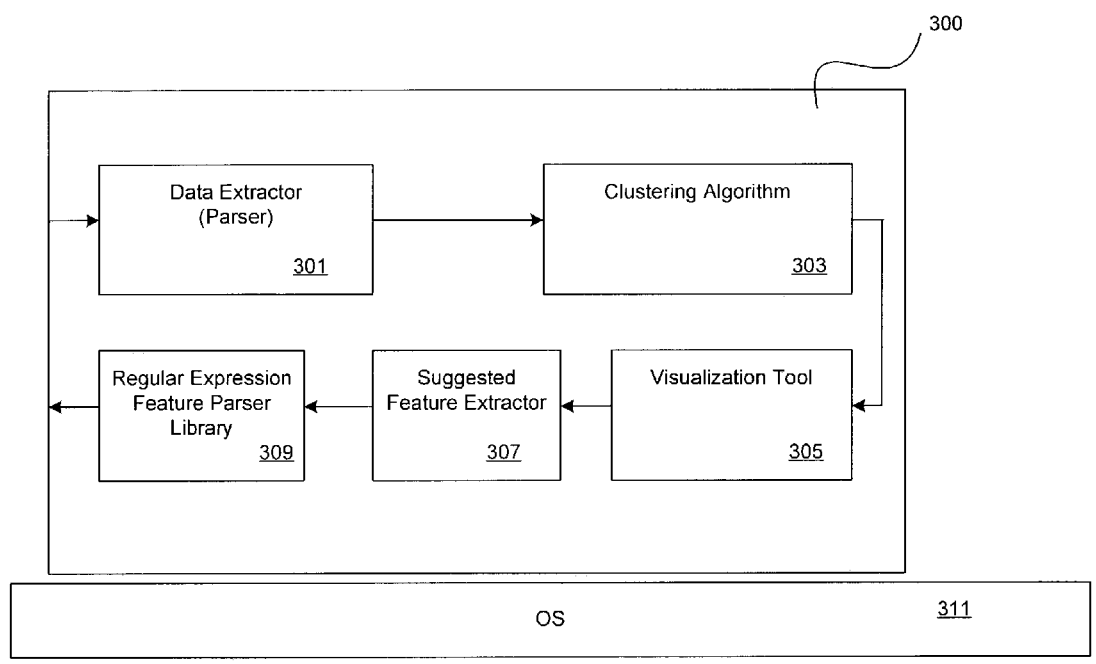
FIG. 3A illustrates the software modules that complete the semi-automated processes of data interpretation according to one embodiment of the present invention.

In addition to these hardware components, data processing system 100 comprises software components (illustrated in FIG. 3A shown), which, when executed by processor 101, implement the dynamic and/or semi-automated processes of the invention. The software components are stored on a medium that is readable by processor 101. Included in these software components are an Operating System (OS) and policy document.

Figure 1B:
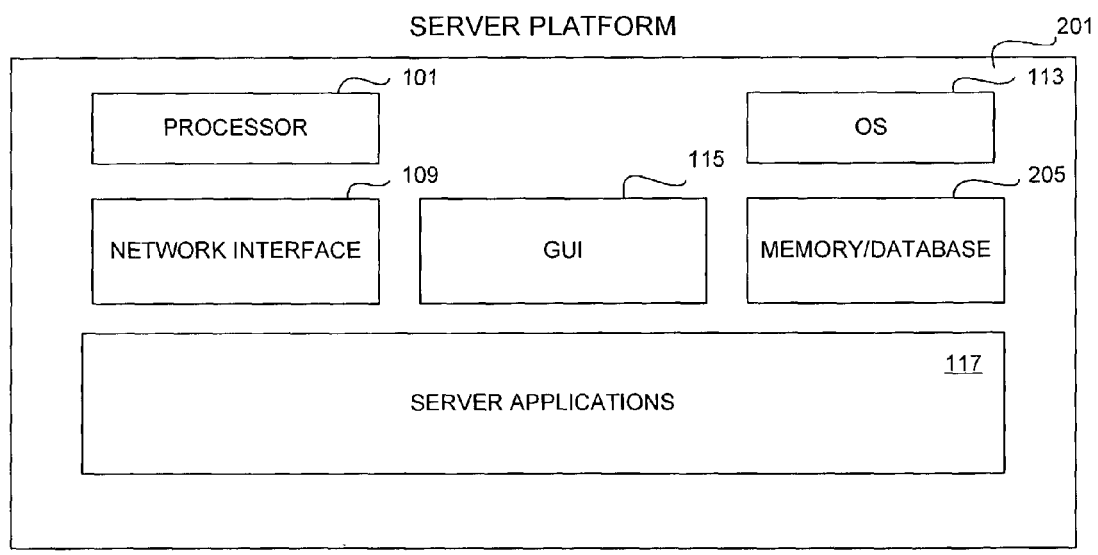
FIG. 1B is a block diagram representation of a server platform with basic hardware and software components illustrated as block modules and within which the features of the present invention may be implemented.
Figure 2:
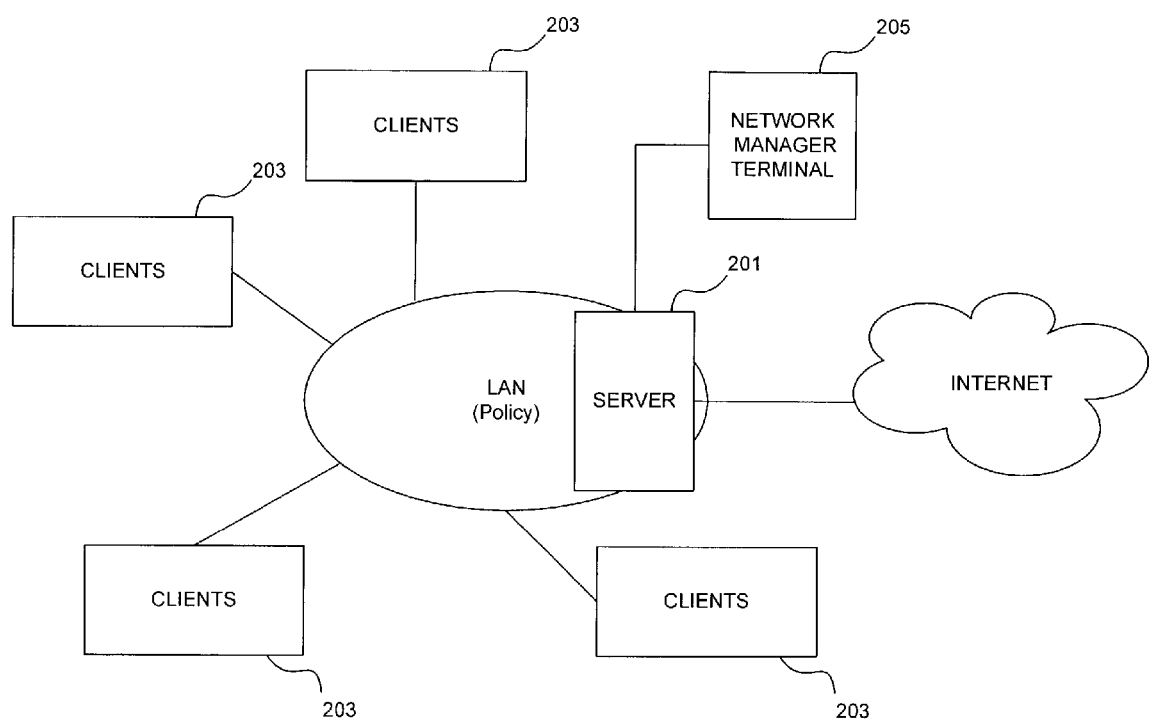
FIG. 2 is a block diagram representation of a network system that generates the unknown data utilized in the data mining techniques provided by one embodiment of the present invention.

FIG. 2 illustrates a basic network comprising server 201 and several nodes at which are coupled network terminals 203. Network terminals may be data processing systems configured similarly to those of FIG. 1. In particular, according to the illustrative embodiment of the invention, server 201 is configured as data processing system 100. Access to server 201 is provided by network administrator terminal 205, although, any one of terminals 203 may also provide access when correct administrative login is provided. Actual configuration of network is not key to the implementation of the invention. However, according to the illustrative embodiment, events occurring on the network passes through (or are directed to) a particular collection point that serves as the database of events, which is utilized as the input to the invention processes.

FIG. 1B is a block diagram representation of server 201, which comprises several similar components with data processing system 100 of FIG. 1A, and in which the data interpretation and network administrative features of the invention may be implemented. As shown, server 201 comprises several hardware components including processor 101, memory/database 205, and network interface 109. Server 201 also comprises software components including OS 113, graphical user interface (GUI) 115, and server applications 117. In the illustrative embodiment, server 201 provides the processing and monitoring features of the invention utilizing specific server applications installed on server by system administrator. GUI 115 enables the system administrator to view the event examples prior to updating the policy documents, etc. as is described in greater detail below.

A general overview of the invention is now presented. According to the illustrative embodiment, an initial security policy document is written or generated and provided as an initial symbolic classifier. When the network is first configured, the policy document may comprise of only very basic rules and security measures. The rules include a listing of events to be monitored or "known events", while all other events occurring on the network are considered unknown events from the perspective of the rule base within the policy document. Notably, the rule base of known events often include references to features of unknown events, which are not themselves tracked/monitored by the policy document.

The dynamic features of the invention are activated by the network administrator (i.e., the software is loaded on the network) and continue running in the background while the network is operating. Network system data is fed through a symbolic classifier, which labels the events recorded as known or unknown according to whether the event has been previously captured within the policy document.

FIG. 3A illustrates the software (and hardware) modules that complete the various semi-automated processes of one embodiment of the invention, including data mining and policy updates. The software modules are provided to the processing system within the network (e.g., server 201) that carries out the network administrative tasks and to which the network administrator has I/O access. These modules are illustrated as separate blocks within a larger block since the software for implementing these features may be packaged as a single software tool. Nomenclature utilized for each of the modules generally describes their respective functionality but does not limit the modules to just those specific features. The illustrated modules include data extractor (or parser) 301, clustering algorithm 303, visualization tool 305 (which includes a hardware-implemented output device), regular expression feature parser library (REFPL) 307, and suggested feature extractor 309. The functional features provided by each of these software blocks and their interaction within the data analysis and interpretation process of the invention are described with reference to FIG. 3B. Notably, as a result of the processes, two functional components are generated, an updated REFPL and an updated data extractor.

Figure 3B:
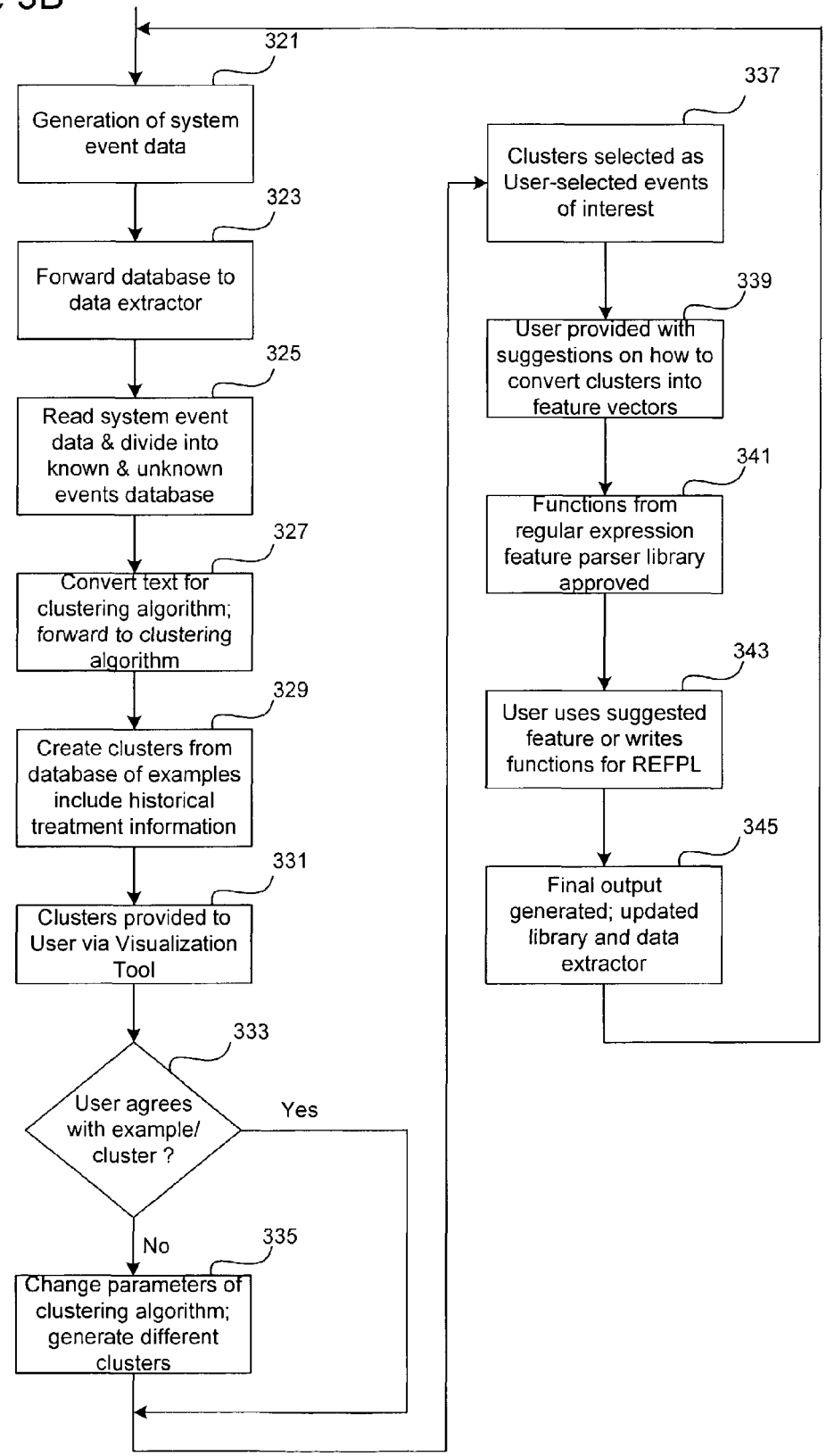
FIG. 3B is a flow chart illustrating the process of completing data mining of unknown network events utilizing the modules of FIG. 3A to generate or update a policy document according to one implementation of the invention.

Referring now to FIG. 3B, there is illustrated a flow diagram of the processing that occurs during implementation of one embodiment of the invention utilizing the software modules of FIG. 3A along with some user input. Notably, in FIG. 3B, the process includes 2 stages of human interaction. For this reason, the policy documents, event window examples, labels, etc., are all provided in human language form making it easy for the human interaction step of the process to be completed. Each step of the process is referred to as a block illustrating the occurrence of a particular event.

The process begins at block 321, which indicates the generation of system event data. The system event data is collected within a database of all events of interest generated by the network as the system operates. As described above, the database (or system log) is a text file. Each line of the text file is assumed to be a single event. At a predetermined (and pre-programmed) interval, the database is forwarded to the Data Extractor, as indicated at block 323 to begin the data check against the established policies within the policy document.

In an alternate embodiment, the system event data may also be generated from various points of the network and sent directly to the Data Extractor, bypassing the text file format and database storage. As such, network data is streamlined to a centralized location of the network for processing. Either embodiment may be implemented and the processing of the events once the event arrives at the Data Extractor is not significantly changed.

As shown at block 325, the Data Extractor reads the system event data from the system log and divides it into two parts, a "Known Events" database and an "Unknown Events" database. Analysis of the Known Events database is described in the co-related patent application entitled "Developing and assuring policy documents through a process of refinement and classification," the entire contents of which are incorporated herein by reference. The Data Extractor achieves the separation of the database by parsing each line of the system log looking for information that identifies the types of events that the data extractor has awareness of.

The co-related application outlines a semi-automated mechanism for constructing policy documents. One of the central features of that IP submission is that a system administrator is permitted to develop a policy document incrementally over time. In the co-related application, the network policy documents are described as written in terms of systems "events," separated into two basic categories called "known" and "unknown" events. The techniques required for taking known events and automatically integrating them into the policy document were described; handling the potentially vast collection of unknown events is the subject of the present invention.

A secondary, though no less important, feature of the present invention is that the invention provides the system administrator with an automatic mechanism for suggesting elements for a policy document that may not be immediately obvious to the system administrator. Thus, the invention recognizes and addresses the fact that there may be important trends "hidden" within the database of unknown events that are essentially undetectable to the system administrator without a good determining tool. Thus, the present invention acts as a kind of monitor on the unknown events, and provides the system administrator with an automatic notification of significant trends in the database of unknown events.

Since not all of these trends are useful to the system administrator, the invention allows the system administrator to personally determine which one of the trends is useful. The judgment of the system administrator is thus critical to the determination whether to include new events into the policy document. Because of the requirements of input from the system administrator, the features/techniques provided by the invention are described as "semi-automated." One feature of the invention is that the monitoring component also provides information on any historical association between the labeled data and the unlabeled data. Labeled data refers to the data within the rule set (synonymous with known events), while unlabeled data refers to data not directly includes within the rule set. Once these associations are identified, they are outputted to the system administrator, who may then elect to incorporate the unlabeled data into the rule set of the policy document. Rules generated from the newly labeled data thus conforms to already established rules within the rule set and the system administrator is provided all the information required to make the modifications to the rule base by the processes of the invention. Trend analysis and detection provides a huge advantage to the system administrator given that there are currently no tools within the art that provides any type of analysis of unknown events.

Returning briefly to FIG. 3B, the events in the system log are converted by the data extractor into examples for the clustering algorithm. That is, the text in the system log is converted to a form that is capable of being passed to a "clustering algorithm." This is accomplished by a parser in a series of steps illustrated in FIG. 3C.

Figure 3C:
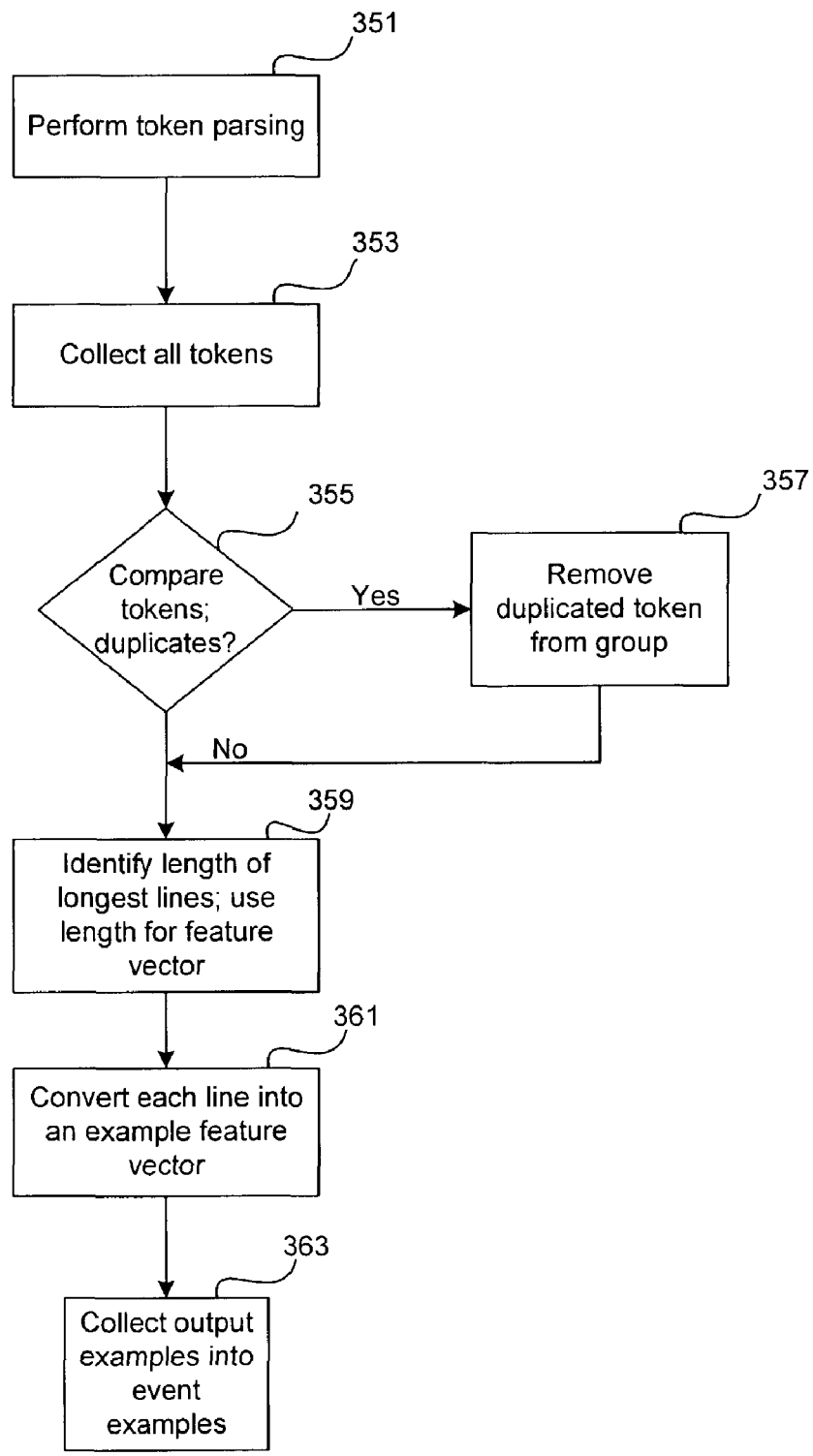
FIG. 3C is a flow chart illustrating the process of parsing data within a database of unknown events in accordance with one embodiment of the present invention.

As shown at block 351 of FIG. 3C, the system log is broken into "tokens" by the parser. Token parsing may be similar to that provided in compiler and other computer-language oriented technology. During that process, each line of the input file is split into "words" that are separated by "whitespace" such as a tab or space.

Following the token parsing operation, the parser collects all of the tokens as shown at block 353 and compares them to determine whether there are duplicates among the tokens as indicated at block 355. When duplicates are found, the duplicates are removed from the group as shown at block 357. The resulting file is a "dictionary" of all the tokens in the system log.

In an alternate embodiment, the parser utilizes the Regular Expression Feature Parser Library to reduce the size of the dictionary. For example, the events of the system log may contain data such as internet protocol (IP) addresses. These addresses are numeric strings, such as "9.3.23.138", for example. Since each IP address is a different sequence of numbers, the parser would consider each a different token. The invention provides a function within the Regular Expression Feature Parser Library, which converts anything of the form "number.number.number.number" into "ip-address." The alternate embodiment enables the parser to leverage the function to reduce the dictionary size.

The length of the lines is compared by the parser to identify the line in the system log that has the greatest number of tokens as shown at block 359. The length of the longest line is utilized as the length of the feature vector that the parser utilizes to convert the events in the system log into examples for the clustering algorithm. Then, as shown at block 361, the parser converts each line of the system log into an example feature vector (also referred to herein as a token vector) of the length of the longest line. For each element of the feature vector, the parser uses the corresponding word from the generated dictionary. The dictionary thus acts as the set of valid values for each element of the feature vector. Once the parser has converted the events in the system log, the parser collects the output examples into Event Examples as shown at block 363.

Returning now to FIG. 3B and particularly to block 327, the clustering algorithms take a database of "examples" and converts that database of examples into smaller subsets or "clusters" as indicated at block 329. The central function of the clustering algorithm is to group elements of the database of examples into subgroups that "closely" resemble each other.

Various techniques for determining the "closeness" of two examples exist. In general, most clustering algorithms use some embodiment of Information Theory to measure the closeness among examples. For the purposes of the present invention, the clustering algorithm is treated as a black box, which may be bought or coded by one skilled in the art. Key to the invention is that the unknown events are mapped into a form appropriate for a clustering algorithm.

In general terms, clustering algorithms require inputs in a form termed "examples." Each example is a "feature vector," which is a vector (like an array) of values. Each element of the vector has an associated set of valid values. Additionally, each example given to the clustering algorithm must be of a set size (i.e., each feature vector must be the same length and have a value for every component of the vector).

Utilization of the clustering algorithm described above is not meant to be limiting on the invention. Other types of clustering algorithms may be utilized, some of which may work with feature vectors of varying length. Description of the invention with same length vectors is solely to ensure compatibility with the largest array of clustering algorithms.

Returning again to FIG. 3B, the clustering algorithm takes the event examples and forms clusters of examples as shown at block 329. The clusters are then presented to the user via the visualization tool as indicated at block 331. The exact type of visualization tool utilized is not material to the description of the invention. The primary idea behind the visualization tool is that the tool is (a) be able to present the clusters and (b) allows the user to view the examples of each cluster. The user is thus provided with all necessary information about the unknown/unlabeled event/data including the historical treatment of the event within the policy document. The user is then able to make an informed decision about the labeling and incorporation of the event into the rule base of the policy document. In the illustrative embodiment, the clustering algorithm includes a built in visualization tool. In alternative embodiments, the output of a clustering algorithm is taken and the clusters presented via any number of presentation media (for example, through a web interface).

Once the user has had a chance to view the clusters, the user may determine whether or not the clusters "make sense," as indicated at block 333. If the user does not agree with any of the clusters, the user may change the parameters of the clustering algorithm to produce different clusters as shown at block 335. Notably, different clustering algorithms have different parameters. For many clustering algorithms, the measure of "closeness" required to form a cluster may be varied. In the illustrative embodiment of the invention, the clustering algorithm utilized has user-settable parameters to control how the clusters are formed.

Once the user is satisfied with the clusters, the last set of clusters formed is considered the User-selected events of interest as show at block 337. These user-selected events may be one or more clusters that the user has determined are of interest and should be incorporated into the policy document. As shown at block 339, the user is then provided with suggestions by the suggested feature extractor about how the examples in the user-selected clusters should be converted into feature vectors for use in the operation of the co-related patent application, previously incorporated by reference, in which a different feature vector format is described.

The suggested feature extractor provides a secondary data-mining function to help the user convert the newly selected events of interest into a form that will be useable in that co-related application. The suggested feature extractor applies the functions from the Regular Expression Feature Parser Library to all of the feature values in the events as illustrated at block 341. For each value, the suggested feature extractor shows which functions from the library are able to parse the value. The user may then utilize these suggested features or write additional functions for the Regular Expression Feature Parser Library as shown at block 343.

Finally, as shown at block 345, the user generates a final output in the form of an updated Regular Expression Feature Parser Library and an updated Data Extractor. By updating these two components, the user enables the classification of new labeled events and automatically incorporates the new labeled events into the policy document.

The present invention takes advantage of the features of the technology that is currently available, namely the parsers and clustering algorithms. Fundamentally, the present invention is unique in the application of these techniques since the invention incorporates the analysis of historical treatment of unlabeled events along with data mining a database of the unknown events for application to the development of policy document. The invention provides a technique that aids the system administrator in developing new policy document statements. More specifically, the invention provides a single system, which provides both a method for data mining a database of unknown events and then automatically incorporating the results of this mining process into an updated policy document. The link between data mining and theory revision is key to future development of policy documents within the industry.

One advantage provided by the invention is that the network administrator is able to ensure that the security of his network is being maintained as outlined in the up-to-date (or current) policy document. The invention further allows the refinement and growth of the security policy over time while automatically taking the historical treatment of events within the network's security measures into consideration. One key aspect of the implementation is that the policy document is maintained and stored in human readable format, thus enabling interaction by the system administration. The implementation in human-readable form is accomplished by integrating classification techniques with well-known theory refinement techniques in such a manner as to create a self-reinforcing process that refines a policy document to better reflect the particulars of a given network and to assure that the policy is being enforced. The invention may be implemented as an add-on tool made available for customers who wish to automate their utilization of a security system.

The approach utilized by the invention finds applicability to any sort of "next generation" network intrusion detection and management tool that integrates AI data-mining techniques with theory refinement techniques. In addition, the implementation process of the invention maybe abstracted to handle any sort of policy-driven tool. That is, the idea of using data mining techniques to provide user advisory tools for development and maintenance of policy documents is useful in other areas as well.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for automatic interpretation of system data utilized to create a policy document, said method comprising:
    tracking events occurring on a system represented by system data said events including known events represented within the policy document and unknown events;
    storing said unknown events in a database of unknown events, wherein only unknown events, separate from known events, are stored in the database of unknown events;
    filtering through each unknown event;
    analyzing said unknown events within said database;
    identifying trends within said database of unknown events based on a historical treatment of said unknown events;
    selectively determining which unknown events among all of the unknown events should be considered for inclusion in said policy document; and
    updating the policy document with event examples associated with the unknown events selected for inclusion.

2. The method of claim 1, further comprising:
    outputting suggested elements from said database for inclusion in said policy documents, wherein said suggested elements are selected and outputted by a software-implemented process.

3. The method of claim 1, wherein said database is a text file configured with a single event per line of text, said method further comprising:
    converting said text to a code form that is readable by a clustering algorithm, wherein the clustering algorithm groups into clusters examples of events that are similar to each other; and
    passing said code foam to said clustering algorithm.

4. The method of claim 1, further comprising:
    grouping similar elements of said database into subgroups; and
    generating a feature vector for said subgroups with an associated set of valid values.

5. The method of claim 3, wherein said converting step converts events in the database into examples for said clustering algorithm.

6. The method of claim 3, wherein said converting step is completed by a parser function and includes:

dividing each line of the database into tokens, each token being a word that is separated by a space, wherein each line within said database is split into words separated by a blank space;

generating a dictionary of tokens comprising a single occurrence of each token, wherein duplication of tokens within the dictionary of tokens is substantially avoided; and converting each line of said database into a token vector with one entry for each token within the line.

7. The method of claim 6, further comprising:

determining a length of the line with a greatest number of tokens;

assigning the length of the line with the greatest number of tokens as the length of each token vector to be utilized to convert events of the database into examples for said clustering algorithm, wherein each token vector is created with said length.

8. The method of claim 6, further comprising:

combining similar event examples into clusters;

outputting said clusters to a user; and enabling user manipulation of parameters of said clustering algorithm to produce different clusters from those clusters originally outputted.

9. The method of claim 7, further comprising grouping similar expressions into a common token expression, wherein IP addresses are provided with a single, surrogate general expression.

10. A computer system for automatic interpretation of system data utilized to create a policy document, said system comprising:

a processor; and program code on a computer readable medium and which is executed by the processor to complete the automatic interpretation of system data utilized to create the policy document, said program code comprising:

program code for tracking events occurring on a system represented by system data said events including known events represented within the policy document and unknown events;

program code for filtering through each unknown event;

program code for storing said unknown events in a database of unknown events, wherein only unknown events, separate from known events, are stored in the database of unknown events;

program code for analyzing said unknown events within said database;

program code for identifying trends within said database of unknown events based on a historical treatment of said unknown events;

program code for selectively determining which unknown events among all of the unknown events should be considered for inclusion in said policy document; and program code for updating the policy document with event examples associated with the unknown events selected for inclusion.

11. The system of claim 10, further comprising:

program code for outputting suggested elements from said database for inclusion in said policy documents, wherein said suggested elements are selected and outputted by a software-implemented process.

12. The system of claim 10, wherein said database is a text file configured with a single event per line of text.

13. The system of claim 12, further comprising:

program code for converting said text to a code form that is readable by a clustering algorithm wherein the clustering algorithm groups into clusters examples of events that are similar to each other; and program code for passing said code form to said clustering algorithm.

14. The system of claim 13, further comprising:

program code for grouping similar elements of said database into subgroups; and program code for generating a feature vector for said subgroups with an associated set of valid values.

15. The system of claim 13, wherein said program code for converting converts events in the database into examples for said clustering algorithm.

16. The system of claim 15, wherein said program code for converting comprises a parser function and includes:

program code for dividing each line of the database into tokens, each token being a word that is separated by a space, wherein each line within said database is split into words separated by a blank space;

program code for generating a dictionary of tokens comprising a single occurrence of each token, wherein duplication of tokens within the dictionary of tokens is substantially avoided; and program code for converting each line of said database into a token vector with one entry for each token within the line.

17. The system of claim 16, further comprising:

program code for determining a length of the line with a greatest number of tokens;

program code for assigning the length of the line with the greatest number of tokens as the length of each token vector to be utilized to convert events of the database into examples for said clustering algorithm, wherein each token vector is created with said length.

18. The system of claim 16, further comprising:

program code for combining similar event examples into clusters;

program code for outputting said clusters to a user; and program code for enabling user manipulation of parameters of said clustering algorithm to produce different clusters.

19. The system of claim 17, further comprising program code for grouping similar expressions into a common token expression, wherein IP addresses are provided with surrogate general expressions.

20. A computer program product, comprising:

a computer readable medium; and program code on said computer readable medium for implementing automatic interpretation of system data utilized to create a policy document, said program code comprising code for:

tracking events occurring on a system represented by system data said events including known events represented within the policy document and unknown events;

filtering through each unknown event;

storing said unknown events in a database of unknown events, wherein only unknown events, separate from known events, are stored in the database of unknown events;

analyzing said unknown events within said database;

identifying trends within said database of unknown events based on a historical treatment of said unknown events;

selectively determining which unknown events among all of the unknown events should be considered for inclusion in said policy document; and updating the policy document with event examples associated with the unknown events selected for inclusion.

21. The computer program product of claim 20, further comprising program code for outputting suggested elements from said database for inclusion in said policy documents, wherein said suggested elements are selected and outputted by a software-implemented process.

22. The computer program product of claim 20, wherein said database is a text file configured with a single event per line of text.

23. The computer program product of claim 22, further comprising program code for:
converting said text to a code form that is readable by a clustering algorithm, wherein the clustering algorithm groups into clusters examples of events that are similar to each other; and
passing said code form to said clustering algorithm.

24. The computer program product of claim 23, further comprising program code for:
grouping similar elements of said database into subgroups; and
generating a feature vector for said subgroups with an associated set of valid values.

25. The computer program product of claim 23, wherein said program code for said converting step converts events in the database into examples for said clustering algorithm.

26. The computer program product of claim 25, wherein said program code for said converting feature comprises a software parser function, which includes program code for:
dividing each line of the database into tokens, each token being a word that is separated by a space, wherein each line within said database is split into words separated by a blank space;
generating a dictionary of tokens comprising a single occurrence of each token, wherein duplication of tokens within the dictionary of tokens is substantially avoided; and
converting each line of said database into token vector with one entry for each token within the line.

27. The computer program product of claim 26, further comprising program code for:
determining a length of the line with a greatest number of tokens; and
assigning the length of the line with the greatest number of tokens as the length of each token vector to be utilized to convert events of the database into examples for said clustering algorithm, wherein each token vector is created with said length.

28. The computer program product of claim 26, further comprising program code for:
combining similar event examples into clusters;
outputting said clusters to a user; and
enabling user manipulation of parameters of said clustering algorithm to produce different clusters.

29. The computer program product of claim 27, further comprising program code for grouping similar expressions into a common token expression, said grouping code including code for replacing IP addresses with a single, surrogate general expression.

* * * * *